United States Patent [19]
Stehling et al.

[11] Patent Number: 5,178,185
[45] Date of Patent: Jan. 12, 1993

[54] SUCTION INLET VALVE FOR FIRE TRUCK PUMPERS

[75] Inventors: Henry J. Stehling, Irving; Grady North, Grapevine, both of Tex.

[73] Assignee: Hydra-Shield Manufacturing Inc., Irving, Tex.

[21] Appl. No.: 665,114

[22] Filed: Mar. 6, 1991

[51] Int. Cl.$^5$ .................. F16K 15/06; F16K 37/00; F16K 15/18

[52] U.S. Cl. .................. 137/543; 137/385; 137/556.3; 251/83; 251/285

[58] Field of Search .................. 137/542, 543, 556.6, 137/556.3, 383, 384.6, 385; 251/82, 83, 285

[56] References Cited

U.S. PATENT DOCUMENTS

| | | | |
|---|---|---|---|
| 2,641,437 | 6/1953 | Jay et al. | 251/83 X |
| 3,875,963 | 4/1975 | Buck et al. | 251/82 X |
| 3,983,899 | 10/1976 | Graham et al. | 137/543 X |
| 3,987,812 | 10/1976 | Nelson | 251/83 X |
| 4,580,596 | 4/1986 | Stehling | 251/83 X |

FOREIGN PATENT DOCUMENTS

| | | | |
|---|---|---|---|
| 1600844 | 3/1970 | Fed. Rep. of Germany | 251/83 |
| 70641 | 6/1959 | France | 251/82 |

*Primary Examiner*—John Rivell
*Attorney, Agent, or Firm*—Millen, White, Zelano and Branigan

[57] ABSTRACT

A suction inlet pump, useful with pumper firetrucks, has a floating valve element which is normally biased closed by a spring. The motion of the floating valve is also positively determined by a cam engaging a shaft extending from the floating valve element and aligned with the cam. The cam is moved from a first position that positively holds the floating valve element completely closed to a second position which allows the floating valve element to fully open. By selectively positioning the cam between the completely closed and fully opened positions, the amount of water entering the valve may be selected so that the valve functions properly for the particular use to which it is put. The suction inlet valve includes a lockable operating handle which is used to rotate and position the cam. An indicator on the exterior of the valve housing indicates the position of the cam. The suction inlet valve is useable for both hydrant and draft applications and is adjustable to accommodate situations in which hydrant pressure is very high, as well as situations where there are a number of hoses served by a pumper, and situations in which the pumper is served by a sequence of shuttling tanker trucks.

12 Claims, 5 Drawing Sheets

SUCTION INLET VALVE FOR FIRE TRUCK PUMPERS

BACKGROUND OF THE INVENTION

This invention relates to suction inlet valves for fire truck pumpers. More particularly, this invention relates to suction inlet valves for fire truck pumpers useable in both hydrant and drafting operations.

Fire companies utilize pumper trucks to increase the pressure of hydrant water flowing through fire hoses and to pressurize water from drafting tanks. Pumpers draw water from sources, such as portable water tanks or fire hydrants, through suction valves.

Illustrative of a widely used suction inlet valve is the Pre-Con valve available from Hydra-Shield Manufacturing, Inc. of Irving, Tex., covered by U.S. Pat. No. 3,983,899. The Pre-Con valve is designed to operate as an automatic flow control valve which eliminates the need for manual adjustments in reaction to water flow. In hydrant operations, the Pre-Con valve automatically opens in proportion to the flow demand and is capable of automatically balancing flow between multiple water sources. The Pre-Con valve's automatic check valve action also minimizes water hammer. When drafting from a source of water, such as a portable water tank, the check valve action of the Pre-Con valve holds prime water when flow is stopped and allows switching to a booster tank and back to drafting without flow interruption. The Pre-Con valve has been used for some twenty years and is an improvement over butterfly valves which it has replaced in many situations.

The typical butterfly valve requires constant manual adjustment to adequately control flow and is subject to higher rates of valve wear requiring disassembly of the valves for maintenance. Moreover, butterfly valves have a relatively low maximum operating pressure of about 175 psi as opposed to a rating of 400 psi for the Pre-Con valves. Since the butterfly valves do not have automatic operation expensive remote controls are at times required to open and close the valves.

While the Pre-Con valves now in service are a vast improvement over butterfly valves, they are subject to corrosion and do not provide for manual as well as automatic operation.

In view of the aforementioned considerations, there is a need for a new and improved suction inlet valve for pumper fire trucks, which valve is less subject to corrosion and has automatic operation that can be manually adjusted if necessary or desired.

SUMMARY OF THE INVENTION

It is an object of the instant invention to provide a new and improved suction inlet valve useful for pumper fire trucks.

In view of the aforementioned object and other objects, the instant invention contemplates an inlet suction valve, useful with pumper firetrucks, wherein the inlet suction valve comprises a valve body having a chamber therein connected to inlet and outlet openings. A floating valve element within the chamber is positioned in alignment with inlet opening for movement between a fully closed position and a fully open position. A spring urges the floating valve element to the fully closed position. The valve element is selectively held in the fully closed position or allowed to move to the fully open position by an adjustable stop which limits travel of the valve element so that the valve element opens automatically by a selected amount.

In accordance with a preferred embodiment, the floating valve element includes a cam follower projecting therefrom and a rotatable cam having a profile with a varying radius, which profile is aligned with the cam follower. The cam engages the cam follower when the floating valve element is in a closed mode and spaced a selected distance from the cam follower when the floating valve element is an openable mode. The space between the cam follower and cam surface progressively increases as the cam is moved from the closed to the completely openable mode.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
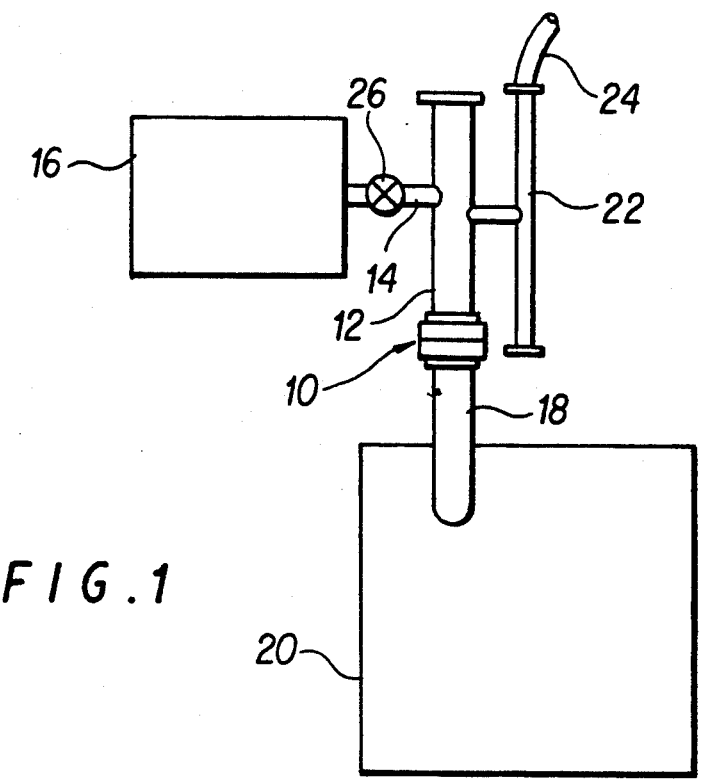
FIG. 1 is a schematic view showing a suction inlet valve of the instant invention drafting water from a portable water tank.

Referring now to FIG. 1, a suction inlet valve, designated generally by the numeral 10 and configured in accordance with the principles of the instant invention, is disposed at the end of a suction pipe 12 used in a drafting operation. The suction pipe 12 is connected by a line 14 to a pumper booster tank 16 within a pumper firetruck (not shown). At its inlet end, the suction inlet valve is connected by a suction hose 18 to a source of water, such as a portable water tank 20. A pump discharge manifold 22 is connected to fire hoses 24 at either or both ends. Upon opening a booster tank valve 26, water is forced at elevated pressure through the fire hoses 24.

After the pump in the firetruck (not shown) is primed and activated, the suction inlet valve 10 automatically opens at about 8 to 10 inches of vacuum if set in an automatic mode. Normally, the suction inlet valve 10 automatically opens or closes in proportion to the volume of water flow.

If the water level in the tank 20 gets too low, the booster valve 26 is opened to decrease the flow resistance from the booster tank 16 allowing the suction inlet valve 10 to automatically close and thereby hold prime water in the suction hose 18. When the water level in the portable tank 20 is restored, the booster valve is closed so as to create a vacuum in the pump which automatically opens the suction inlet valve 10.

If it is desired to utilize the pumper booster tank 16 as an emergency reservoir, the suction inlet valve 10 allows the operator to switch back and forth from drafting from the portable water tank 20 to the booster tank 16 without disrupting water flow through the fire hoses 24. In the event that all discharge lines 24 are shut off, the suction inlet valve 10 automatically closes to hold prime in the suction hose 18.

From the above discussion, it is seen that the suction inlet valve 10 is critical to proper operation of a pumper firetruck. In order to tune the system to particular situations, it is advantageous to have the capability of manually adjusting the amount that suction inlet valve 10 opens.

Figure 2:
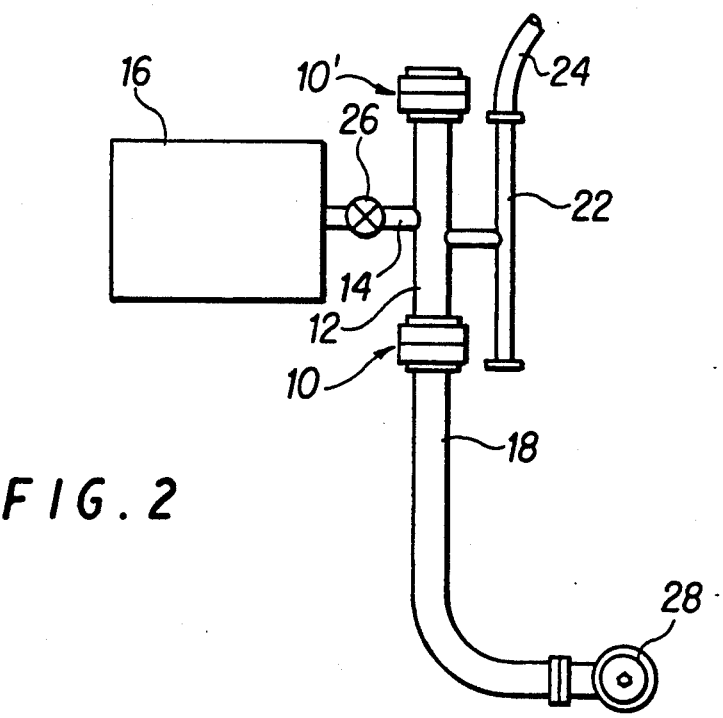
FIG. 2 is a schematic illustration showing use of a suction valve according to the instant invention with a fire hydrant.

Referring now to FIG. 2 where similar elements have the same reference numeral, a pumper truck is schematically shown working from a fire hydrant 28. When the hydrant 28 is turned on, water pressure automatically opens the suction inlet valve 10 if the valve has been manually adjusted for automatic operation. The suction inlet valve 10 opens at approximately 5 psi and will open in proportion to the flow demand. When flow is shut off through the pump discharge line 22, the suction inlet valve 10 automatically closes and, due to its novel configuration, reduces the water hammer effect in the suction hose 18 and fire hydrant 28. If it is desired to provide water from an auxiliary source, an additional inlet suction valve 10' can be connected to the opposite end of pump suction line 12.

Working from a fire hydrant 28, it is advantageous to provide for automatic operation of suction inlet valves 10 which automatic operation can be adjusted and if necessary, overridden. This is especially so when there are pair of suction inlet valves 10 connected to the same pump suction line 12. As will be explained in detail hereinafter, the suction inlet valve 10 has a control handle which determines the setting of automatic flow control pumper suction inlets. In its automatic mode, the valve 10 automatically opens or closes in response to flow demand. As more discharges are opened from a pumper truck, or if nozzle flows increase, the valve 10 automatically opens to the limit of the control handle setting. If flow is reduced, the valve 10 automatically closes proportionally and when flow is stopped, the valve closes completely. Automatic adjustment and operation is particularly important in reducing the effects of water hammer caused by abruptly shutting off a nozzle attached to a fire hose 24.

Valve 10 also functions as a one way flow valve. During fire hydrant operations (FIG. 2), high pressure water sources which occur during operations, such as pump relay operations, are prevented by the valves 10 from overriding low pressure water sources. Multiple inlets with the valves 10 can be used to balance the water flow from several different sources. When used in the drafting mode of FIG. 1, the automatic check valve action of valve 10 holds prime water in the suction hose 18 when flow is stopped. This is very important because the system does not have to reprimed to restart the pumping operation.

Figure 3:
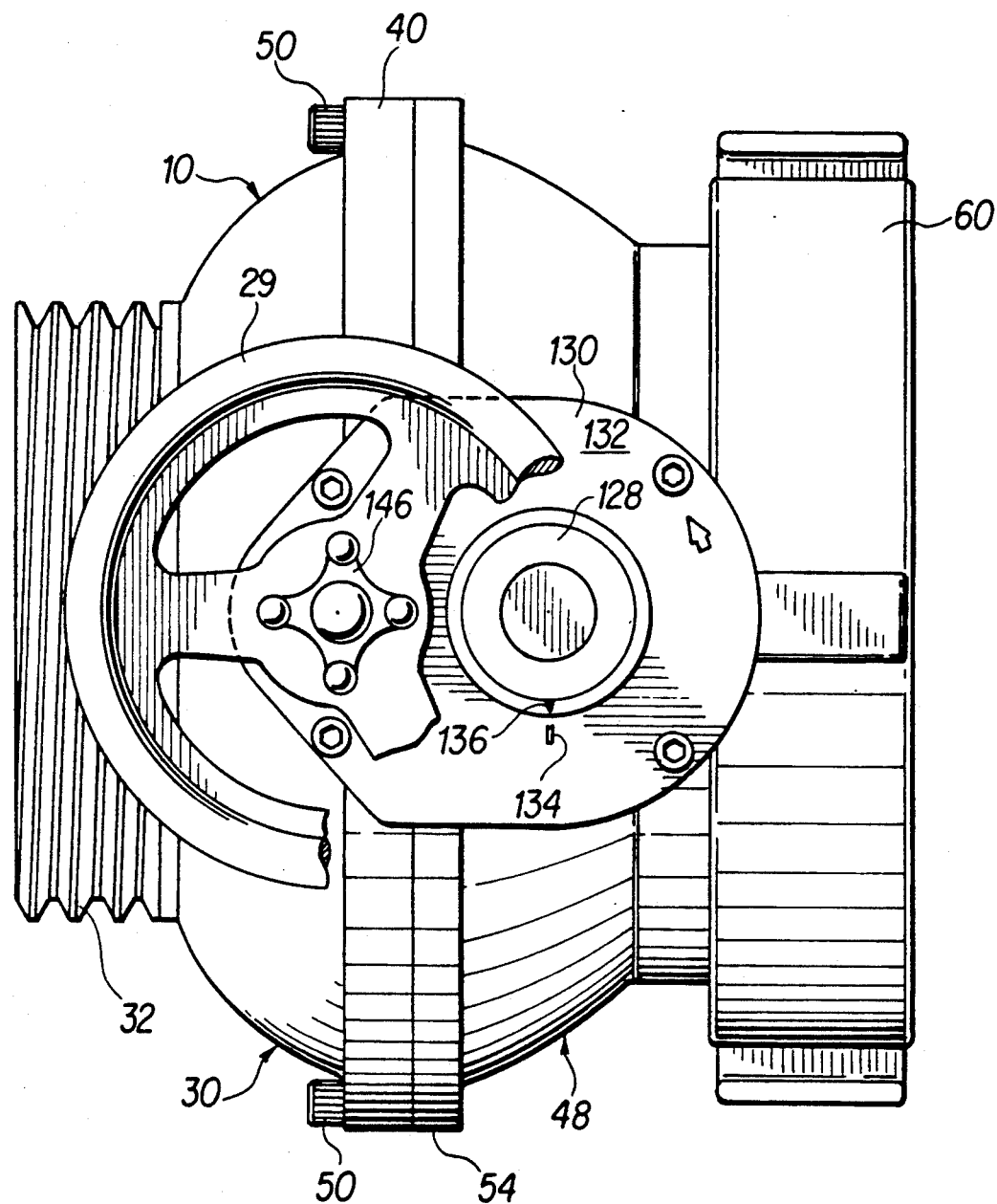
FIG. 3 is a top view of the suction inlet pump according to the instant invention.

With the foregoing background in mind, a particular structure of the valve 10 suitable for providing automatic operation which is manually adjustable is set forth in FIGS. 3–6. Referring first to FIG. 3, it is seen that the valve 10 has an operating handle 29 which selectively sets the mode to a fully "closed" mode, a fully "open" mode or a setting selected therebetween. As will be fully explained hereinafter, the valve 10 opens automatically at any setting other than fully closed mode, however, the volume of flow is reduced at settings other than the fully open mode.

Figure 4:
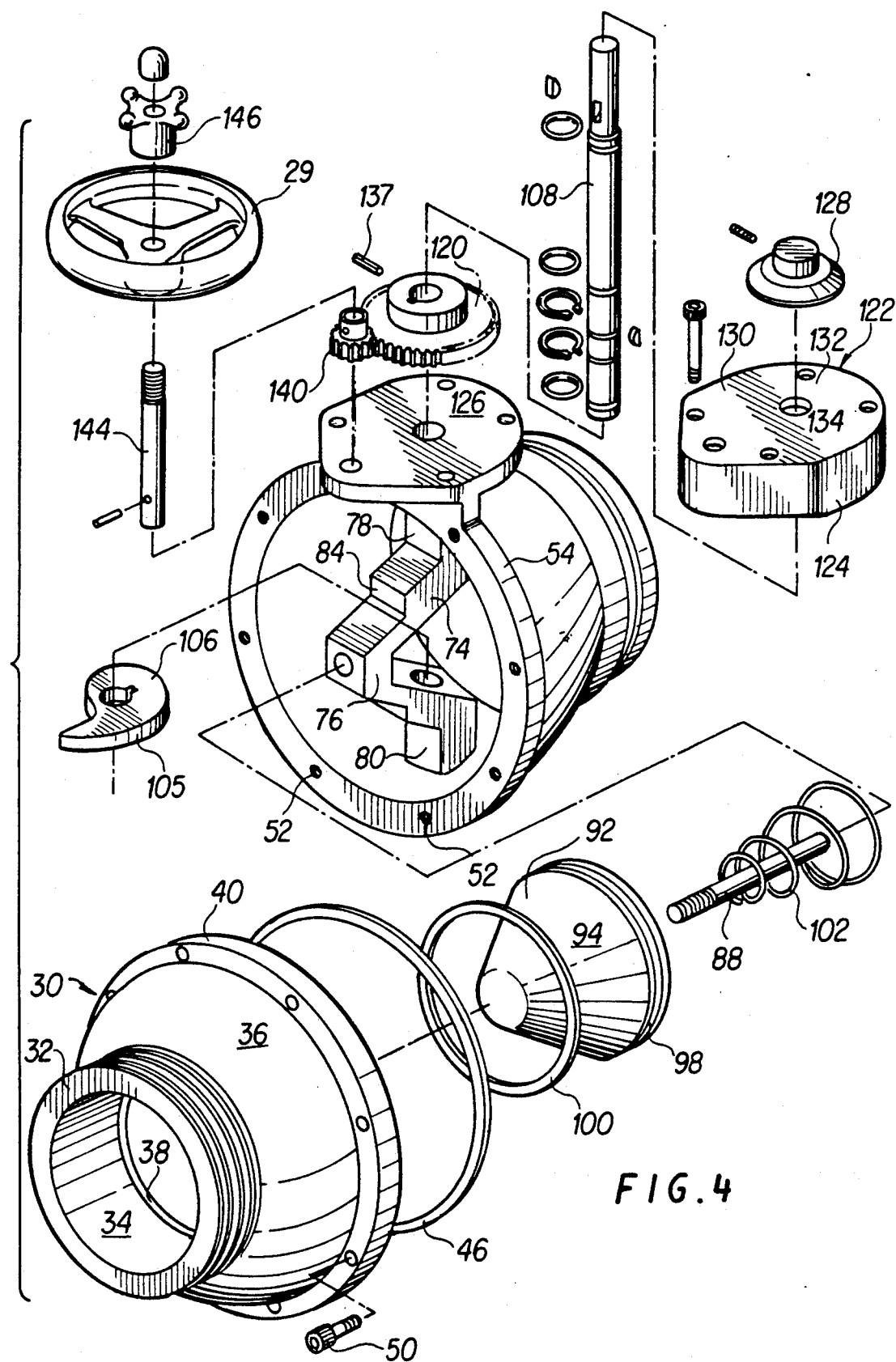
FIG. 4 is an exploded view showing the various elements comprising the valve of FIG. 3.
Figure 5:
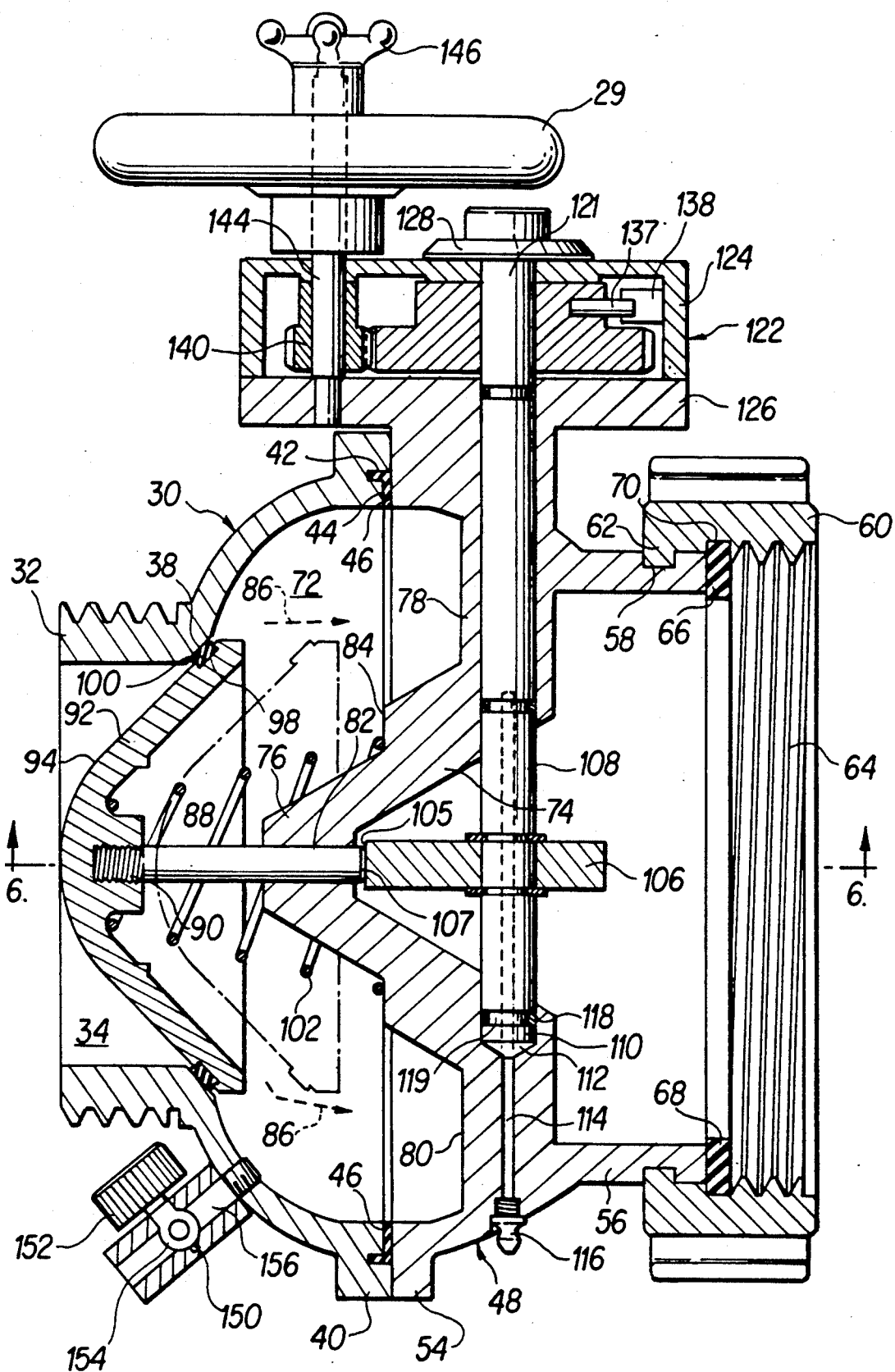
FIG. 5 is a side elevation of the suction inlet pump of FIG. 3.
Figure 6:
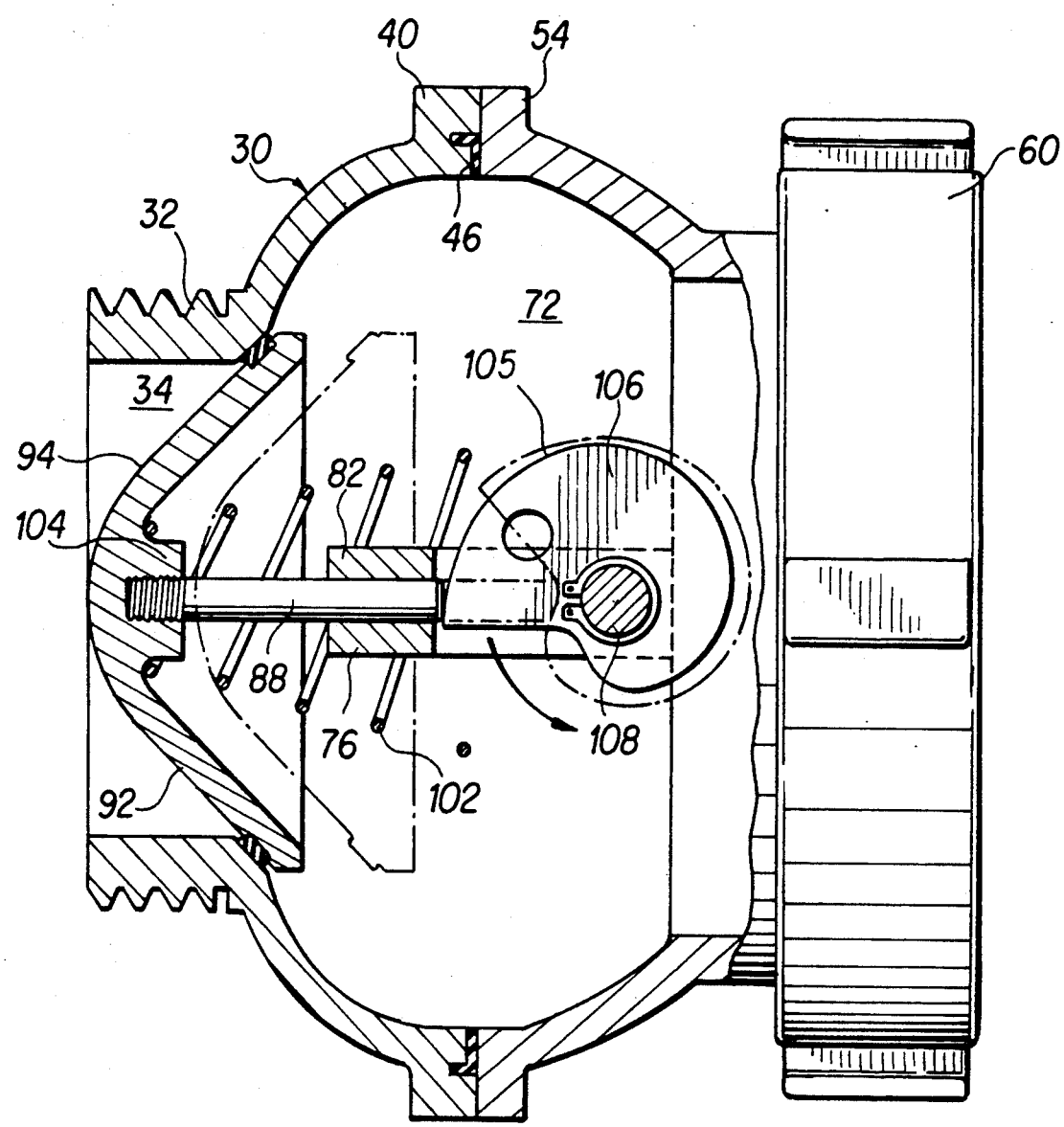
FIG. 6 is a top elevation taken along lines 6-6 of FIG. 5 of the suction inlet pump of the instant invention.

Referring now mainly to FIGS. 4–6, the pump 10 comprises a male body portion 30 which has a threaded neck 32 onto which is threaded a suction hose such as the suction hose 18 of FIGS. 1 and 2. The neck 32 has a mouth 34 therein into which water flows. The water may be under pressure, such as the pressure applied from the fire hydrant 28 of FIG. 2, or may be unpressurized if provided by a source such as the portable water tank 20 of FIG. 1. The male body member 30 has a bowl portion 36 with an annular flat area 38 which joins the bowl portion 36 to the mouth 34. The bowl portion 36 has a radial flange 40 extending therefrom which has a groove 42 which cooperates with a stepped-down portion 44 to receive a gasket 46. As is seen in FIG. 5, the gasket 46 is pressed to conform to the groove 42 and steppeddown portion 44 so as to appear L-shaped in crosssection.

Abutting the male valve body 30, is a female valve body, designated generally by the numeral 48, and held in abutment therewith by a plurality of Allen head bolts 50 received in threaded bores 52 in an annular shoulder 54 around the periphery of the female body member 48. The female body member 48 has a neck 56 extending therefrom which includes an annular groove 58. Mounted on the neck 56 is a threaded collar 60 which has an annular rim 62 received in the groove 58. The threaded collar 60 is internally threaded with threads 64 which threadably receive male fittings on the suction pipes 12 of FIGS. 1 and 2. In order to ensure a leakproof seal, a gasket 66 abuts the end 68 of neck 56 and is loosely received in an annular groove 70 within the collar 60. Since the rubber seal 66 may be subject to considerable wear, it is readily replaceable.

The male valve body 30 and female valve body 48 cooperate to define a chamber 72. Projecting radially inward into the space 72 from the female valve body 48 is a support 74 which includes a V-shaped pedestal portion 76 and upper and lower legs 78 and 80 for securing the pedestal to the female valve body 48. The V-shaped pedestal 78 has a bore 82 therethrough and an annular shoulder 84. As is seen in FIG. 4, the support 74 extends across the valve body so that water can flow through the chamber 72 in the direction of arrows 86 when the valve is open.

Slidably received through the bore 82 in the apex of the V-shaped pedestal 76 is a valve stem in the form of stop shaft 88 which has a threaded end 90. Threaded on the threaded end 90 is a cone-shaped floating valve element 92 having a first surface portion 94 which faces into the neck 34 of the male valve body 30 and a second surface 96 which faces into the chamber 72. The conical floating valve element 92 has an annular groove 98 through the first surface 94 which has a gasket 100 bonded thereon. The gasket 100 seats against the flat area 38 on the inner wall of the male valve body 30 when the conical valve element 92 is urged thereagainst by a coil spring 102. The coil spring 102 has one end abutting shoulder 84 on the pedestal 76 and the other end seated against the surface 96 around an internally threaded nut portion 104 of the floating valve element 92. Coil spring 102 exerts a selected force on the floating valve element 92 to keep the valve element closed until pressure in the mouth 34 of the male body portion 30 exceeds the pressure within chamber 72 by about 5 psi. If the floating valve element 92 is only held against the surface 38 by the spring 102, the floating valve element will move to the dotted line position of FIG. 5 compressing the spring 102 if the 5 psi threshold is exceeded. Thus, the valve 10 will function in an automatic mode when held closed only by the spring 102.

As has the previously discussed, there are some situations in which it is advantageous to manually adjust automatic operation of the floating valve element 92. Accordingly, the valve stem or stop shaft 88 is abutted at its free end 107 by the profile surface 105 on a cam 106. The cam 106 is rotatable from the solid line position of FIG. 6, where the floating valve element 92 is held closed, to the dotted line position, where the floating valve element 92 will open fully when the water pressure differential between mouth 34 and chamber 72 exceeds about 5 psi. The cam surface profile 105 is selected to allow the floating valve element 92 to first open slightly upon and then to allow rapid movement to the fully open position. As is best seen in FIG. 5, the cam 106 is fixed to shaft 108 which is journaled at a first end 110 in a bore 112 which is lubricated via a bore 114 through a nipple 116. In order to prevent water in the hydrant from accumulating a bore 112 an O-ring seal 118 is placed in a groove 119 on the shaft 108.

The shaft 108 has a second end 119 to which a gear 120 is fixed. The gear 120 is retained within a housing 122 formed by a cover 124 bolted to a base 126 which is unitary with the female valve body 48. Since the cam 106 is concealed by the casing formed of body members 30 and 48, the operator needs some way to determine the position of the cam and thus the condition of the floating valve element 92. This accomplished by a dial 128 fixed to the shaft 108 and disposed on the outer surface 130 of the cover 124. As is seen in FIG. 3, the outer surface 130 of the cover plate 124 has an 37 open" position 132 and a "closed" position 134 delineated thereon while the dial 128 has a pointer 136 which is alignable with the open and closed positions and indicates positions selected therebetween. Rotation of the shaft 108 is limited to less than 360° by a stop pin 137 integral with the gear 120 which engages a stop surface 138 on the cover 124 of the housing 122.

Since during operation of the valve 10 there may be considerable water pressure directed against the front face 94 of the floating valve element 92, the stop shaft 88 may bear tightly against the cam surface 105 of cam 106. Accordingly, mechanical advantage is achieved by meshing a pinion 140 with the gear 120 and fixing the operating handle 29 to the pinion 140 via a shaft 144 journaled in the base 126 and cover 124 of the housing 122. Since it is possible for water pressure to also rotate the cam 106 when the cam is disposed between its fully opened and fully closed position, a locking nut 146 is threaded onto the shaft 144 to be tightened down against the handle 29 so as to urge the handle into a frictional engagement with the surface 130 of the cover 124. This prevents the handle 142 from rotating thereby locking the shaft 108 and thus the cam 106.

From the closed position the valve 10 can be opened manually by turning the operating handle 142 counter clockwise (see FIG. 5). Only three turns of handle 142 are required to allow complete opening of the valve 10. As has been previously stated, the profile 105 of the cam 106 is such that the floating valve element 92 is allowed relatively small travel during the first one or two turns of the handle 29 and can open fully at the end of the last turn.

In order to equalize pressure inside the chamber 72 with the atmospheric pressure (and to drain water remaining in the chamber after the valve 10 has been used), a bleeder valve 150 is disposed in the bottom of the chamber. The bleeder valve 150 is manually opened and closed by turning a knob 152 which rotates a ball valve 154 within a bore 156 of the bleeder valve 150.

In that corrosion is a concern in any equipment that handles water, the male and female body valve bodies 30 and 48 which enclose the chamber 72 are made of a high strength bronze (copper alloy) material and the internal valve parts are made of corrosion resistant stainlesssteel.

The aforedisclosed suction inlet valve is designed to operate under a variety of conditions and fire department operating procedures. Where high operating pressures are common, the valve control handle 29 is set in a slightly open position with the floating valve 92 remaining closed until flow has begun or a vacuum is created. Opening the control handle 142 slightly restricts how far the floating valve element 92 can open so as to reduce incoming pressure. The floating valve element 92 automatically closes when flow is stopped at the discharge outlets of hoses 24 (see FIG. 2). The control handle 142 can then be moved to the fully closed position.

During hydrant operation, long hose lays of large diameter hose 24 continue to accumulate air when the hose is first charged. In order to purge air before it enters the valve 10, the valve is slightly opened from the closed position. Bleeder valve 150 is then used to purge air. If it is necessary to expel large volumes of air, an elbow adaptor (not shown) with an air purge fitting may be used. With using the suction inlet valve 10, a relief valve is not necessary since the valve design itself reduces the effects of water hammer transmitted to the supply hose 18. If for some reason, a relief valve does become necessary in the supply line 18, a 30° elbow adaptor with a relief valve may be used.

In a normal drafting operation, the suction inlet pump 10 is set in the fully open position and the pump 16 is primed. When water flow is stopped, the floating valve element 92 automatically closes to hold prime water in the suction hose 18. If the drafting is started after establishing a tank flow operation, the suction inlet valve 10 is set in the closed position and then slightly opened to allow the vacuum pump to remove air from the suction hose 18. If the pump vacuum is not sufficient to move the floating valve element 92, then the tank to pump line 26 is slightly closed or the pump primer operated. When the suction hose 18 is primed, the suction inlet valve 10 is in the fully open mode and the tank to pump line is closed.

Once prime has been established within the suction inlet pump 10, the floating valve 92 provides automatic check valve action which helps prevent loss of prime. In order to utilize this feature in a tanker shuttle operation, where tanker trucks deliver water to a firefighting site sequentially, the tank to pump line is opened when the draft supply of water is low. The suction inlet valve 10 then automatically closes to hold prime water in the suction hose 18. During a tanker shuttle operation, operating pressure will vary due to the change in elevation of the water source. If a high vacuum is indicated, dischargers may have to be closed slightly to reduce the flow and to prevent the suction inlet valve 10 from prematurely opening. When the water supply is replenished in the drafting source, the tank to pump line is closed so as to reestablish draft flow.

From the foregoing discussion, it is seen that the suction inlet valve 10 accommodates itself to various operating procedures by providing flexibility during automatic operation. This flexibility is accomplished by selecting valve openings between a completely closed mode and completely open mode.

Without further elaboration, it is believed that one skilled in the art can, using the preceding description, utilize the present invention to its fullest extent.

The entire disclosures of all applications, patents and publications cited herein, are hereby incorporated by reference.

What is claimed is:

1. An inlet suction valve useful with pumper fire trucks, the inlet suction valve comprising:
   a valve body having a chamber therein and inlet and outlet openings;
   a floating valve element including a cam follower projecting therefrom, the cam follower having a stem which is received and restrained to slidable movement within a bore in a support integral with a valve casing to control the amount that the floating valve element opens;
   means for holding the floating valve element in alignment with the inlet opening for movement between a fully closed position and a fully pen position;
   spring means engaging the floating valve element for urging the floating valve element to the fully closed position;
   means for selectively holding the valve element in the fully closed position and allowing the valve element to move to the fully open position, the selection means including a rotatable cam for selectively limiting travel of the valve element so that the valve element opens only partially;
   said rotatable cam having a profile with a varying radius, which profile is aligned with the cam follower, the cam engaging the cam follower when the floating valve element is in a closed mode and being spaced a selected distance from the cam follower when the floating valve element is in an openable mode, the space between the cam follower and cam profile increasing as the cam is moved from the closed to the open mode;
   a shaft for mounting the cam, the shaft being in direct alignment with an extending perpendicular to the stem, and
   operating means for the shaft mounted on the exterior of the valve housing.

2. The suction inlet valve of claim 1, wherein the shaft includes a dial rotatable therewith, the dial being marked to indicate open and closed positions of the floating valve element.

3. The suction inlet valve of claim 2, wherein the shaft has a relatively large diameter gear fixed thereto and the operating means includes a relatively small diameter gear meshed with a relatively large diameter gear, the relatively small diameter gear being mounted on a second shaft to which an operating handle is secured for rotating the small diameter gear and thus, the large diameter gear, the cam shaft and the cam.

4. The suction inlet valve of claim 3, further including a stop mounted adjacent the large gear which is engageable by another stop on the large gear to limit rotation of the large gear and thus the cam shaft to less than 360°.

5. The suction inlet valve of claim 4, further including means associated with the operating handle for locking the operating handle in a selected position for fixing the position of the cam with respect to the cam follower.

6. The suction inlet valve of claim 5, further including a bleeder valve in communication with the valve chamber for venting air trapped in the valve chamber.

7. An inlet suction valve useful with pumper fire trucks, the inlet suction valve comprising:
   a valve body having a chamber therein and inlet openings;
   a floating valve element including a cam follower projecting therefrom, the cam follower having a a stem which cooperates with a bore in a support integral with the valve casing to control the amount that the floating valve element opens;
   means for holding the floating valve element in alignment with the inlet opening for movement between a fully closed position and a fully open position;
   spring means engaging the floating valve element for urging the floating valve element to the fully closed position;
   a rotatable cam mounted on a first rotatable shaft restrained by the support and having a profile with a varying radius, which profile is aligned with the cam follower, the cam engaging the cam follower when the floating valve element is in a closed mode and being spaced a selected distance from the cam follower when the floating valve element is in an openable mode, the space between the cam follower and cam profile increasing as the cam is moved from the closed to the open mode;
   an operating means being connected to a second rotatable shaft; and
   a relatively large diameter gear mounted on the first shaft and having a relatively small diameter gear mounted on the second shaft meshed therewith, whereby the gears allow an operator to effectively gate down pressure upon rotating the second shaft.

8. The suction inlet valve of claim 7, wherein the shaft includes a dial rotatable therewith, the dial being marked to indicate open and closed positions of the floating valve element.

9. The suction inlet valve of claim 7, further including a stop mounted adjacent the large gear which is engageable by another stop on the large gear to limit rotation of the large gear and thus the cam shaft to less than 360°.

10. The suction inlet valve of claim 8, further including means associated with the operating means for locking the operating means in a selected position for fixing the position of the cam with respect to the cam follower.

11. The suction inlet valve of claim 10, further including a bleeder valve in communication with the valve chamber for venting air trapped in the valve chamber.

12. The suction inlet valve of claim 7, wherein the operating means is a handle.

* * * * *

UNITED STATES PATENT AND TRADEMARK OFFICE
CERTIFICATE OF CORRECTION

PATENT NO. : 5,178,185
DATED : January 12, 1993
INVENTOR(S) : Stehling et al.

It is certified that error appears in the above-identified patent and that said Letters Patent is hereby corrected as shown below:

Claim 1; Col. 7; Line 23:

Insert the letter --o--

Should read: a fully closed position and a fully open position;

Signed and Sealed this

Twenty-sixth Day of October, 1993

Attest:

BRUCE LEHMAN

Attesting Officer

Commissioner of Patents and Trademarks